April 11, 1961   N. M. SULLIVAN   2,979,177
BRAKE SYSTEM FOR A ROLLER TYPE CONVEYOR
Filed Oct. 7, 1957   3 Sheets-Sheet 1
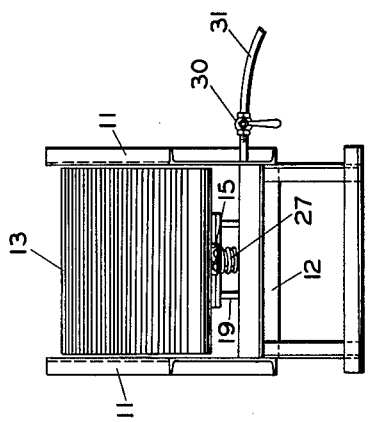
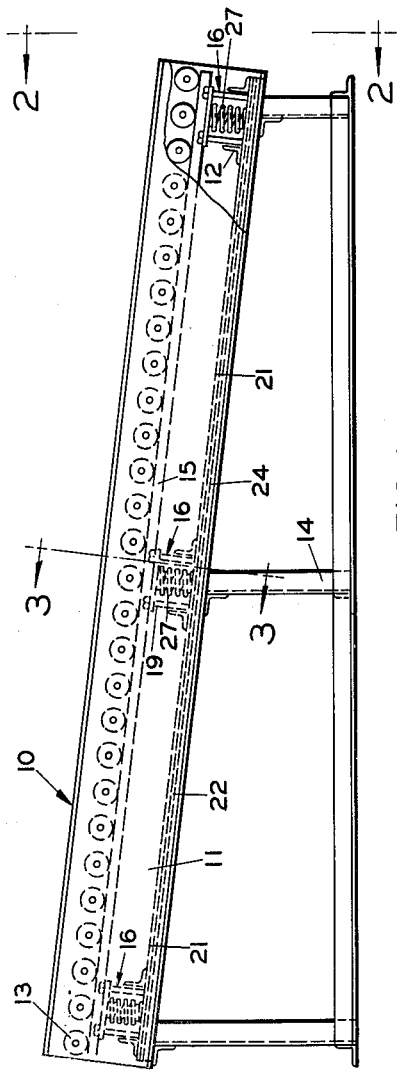
INVENTOR.
NORMAN M. SULLIVAN
BY
CORBETT, MAHONEY, MILLER & RAMBO, ATTY'S

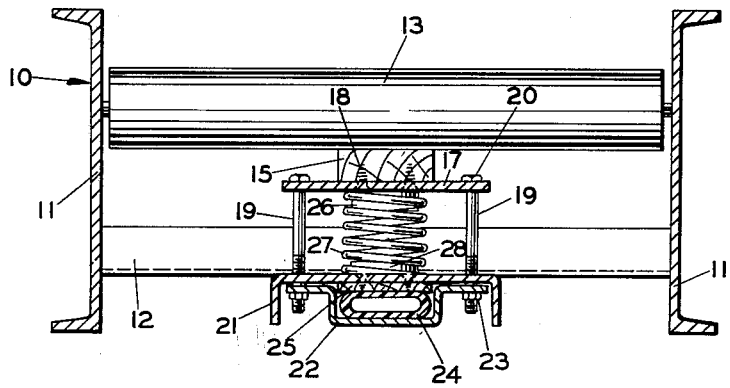
FIG. 3
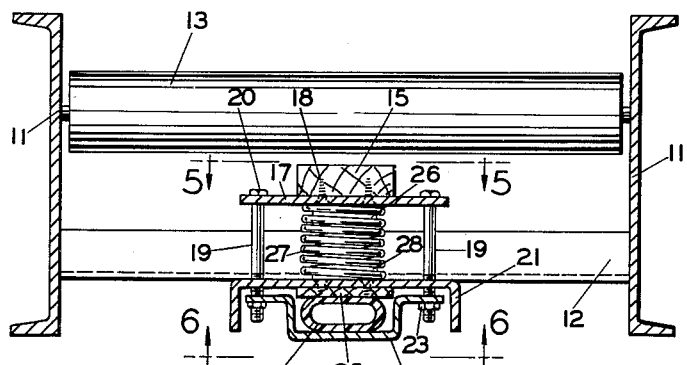
FIG. 4
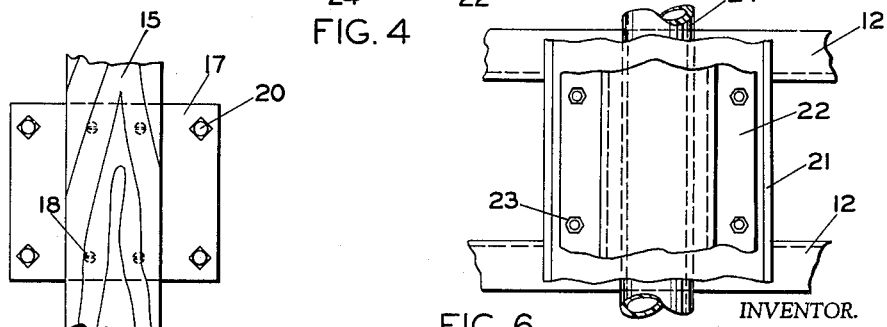
FIG. 5
FIG. 6
INVENTOR.
NORMAN M. SULLIVAN
BY
CORBETT, MAHONEY, MILLER & RAMBO, ATTY'S April 11, 1961 N. M. SULLIVAN 2,979,177
BRAKE SYSTEM FOR A ROLLER TYPE CONVEYOR
Filed Oct. 7, 1957 3 Sheets-Sheet 3

INVENTOR.
NORMAN M. SULLIVAN
BY
CORBETT, MAHONEY, MILLER & RAMBO, ATTY'S.

United States Patent Office 2,979,177
Patented Apr. 11, 1961

2,979,177

BRAKE SYSTEM FOR A ROLLER TYPE CONVEYOR

Norman M. Sullivan, Cincinnati, Ohio, assignor to The Alvey-Ferguson Company, Cincinnati, Ohio, a corporation of Ohio Filed Oct. 7, 1957, Ser. No. 688,520

5 Claims. (Cl. 193—35)

This invention relates to a brake system for a roller type conveyor. It has to do, more particularly, with a friction type brake system for use with conveyors of the roller type along which articles feed by gravity.

Roller type conveyors, as is well understood, are used for moving various articles. The articles roll along these conveyors by gravity and it sometimes happens, especially with heavy objects, that they move too fast out of control and may be damaged by striking other objects on the conveyor or as they leave the conveyor. For example, in handling large home appliances, the damage might be considerable due to the cost of such articles. It, therefore, would be desirable to provide some type of braking system for conveyors of this type so that articles moving along the conveyor could be kept under control.

It is the main object of this invention to provide a friction type brake system for use in connection with roller type conveyors whereby the speed of movement of articles rolling along the conveyor can be controlled.

It is another object of this invention to provide a braking system of the type indicated which is of such a nature that if the system fails for any reason, the brake will be automatically applied.

It is a further object of this invention to provide a system of the type indicated which is of very simple construction and relatively inexpensive to fabricate and apply to a conveyor of the type indicated.

Various other advantages will be apparent.

In the accompanying drawings, preferred embodiments of this invention are illustrated but it is to be understood that details thereof may be varied without departing from basic principles of this invention.

In these drawings:

Figure 1 is a side elevational view, partly broken away, showing one example of this invention in association with a roller type gravity feed conveyor unit for applying the braking force to the rollers thereof.

Figure 2 is a front end elevational view of the conveyor unit shown in Figure 1 taken along line 2—2 of Figure 1.

Figure 3 is a transverse vertical sectional view taken along line 3—3 of Figure 1 showing the brake applied.

Figure 4 is a similar view but showing the brake released.

Figure 5 is a detail in top plan taken along line 5—5 of Figure 4.

Figure 6 is a detail in bottom plan taken along line 6—6 of Figure 4.

Figure 7:
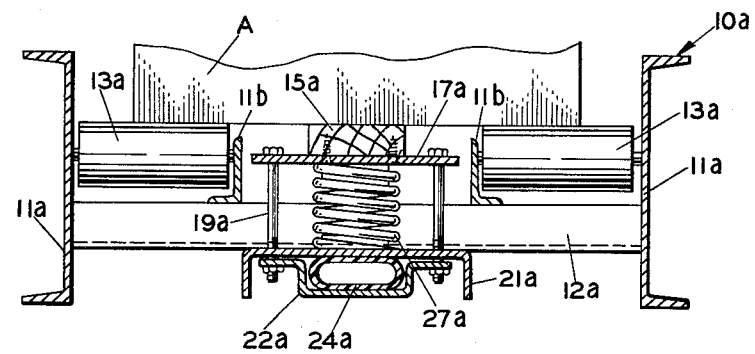
Figure 7 is a view similar to Figure 3 but showing the invention in association with another roller type gravity feed conveyor unit for applying the braking force directly to the articles carried on the conveyor unit, the brake being shown applied.

With particular reference to the drawings, and especially to Figures 1 and 2, this invention is shown applied to one form of a conveyor unit 10 of the gravity feed roller type. Conveyor units of this type usually consist of the longitudinally extending laterally spaced beams or channels 11 which are rigidly secured together, in spaced parallel relationship, by means of transverse angles 12 or other suitable cross braces. Between the beams 11, the transversely disposed rollers 13 are mounted in a suitable manner. These rollers are mounted for free rotation relative to the beams and are disposed in slightly spaced relationship with their axes parallel. The entire unit 10 is inclined downwardly, as exaggerated in Figure 1, in the direction of desired movement of the articles so that articles placed thereon will feed along the conveyor unit by gravity. In the example shown in Figure 1, the conveyor unit 10 is supported in inclined position on a frame 14 but it is to be understood that this is for illustration only and that the conveyor unit may be supported in inclined position by other arrangements.

As previously indicated, the rollers 13 are usually freely rotatable and are not under any control. According to this invention, however, a brake system of a friction type is provided in association with the rollers so that the rotation of the rollers can always be controlled or can be completely stopped, if desired.

This brake system comprises a friction shoe 15 which, as shown in Figure 1, preferably extends the full length of the conveyor unit 10. This shoe 15, as indicated best in Figures 3 and 4, will be disposed directly beneath the rollers 13, preferably midway between the ends thereof, and is mounted for movement in a plane perpendicular to the plane of the rollers. This shoe 15 is preferably in the form of a flat plank or strip of wood although other materials may be used. The shoe 15 is supported by brake applying and releasing units 16 disposed at longitudinally spaced intervals.

Each of the units 16 comprises a square metal plate 17 which is attached to the lower surface of the shoe 15 by screws 18 or other suitable means. Passing downwardly through this plate at the corners thereof are the bolts 19 provided with the heads 20. The threaded ends of these bolts pass slidably through openings in an inverted channel member 21 which extends the entire length of the conveyor unit 10. This inverted channel 21 extends beneath and is rigidly secured to all the cross braces 12, for example, by welding. Suspended from the lower ends of the bolts 19 is a cradle channel 22, the bolts being provided with nuts 23 upon which the channel 22 rests. The upright channel 22 is disposed within the inverted channel 21 and extends the full length thereof. The cradle channel 22 receives a flexible conduit 24 which can be expanded and contracted by fluid pressure, for example, by air pressure. The channels 21 and 22 serve as a housing for the conduit 24. This conduit 24 is preferably similar to a fire hose and is of reinforced flexible wall construction. The lower surface of the inverted channel 21 may carry a non-metallic protective pad 25 which will engage the top surface of the conduit 24.

The lower surface of each plate 17 is provided with a cylindrical spring centering boss 26 which receives the upper end of a compression spring 27 that forms a part of each unit 16. The lower end of each spring 27 fits around a similar boss 28 on the upper surface of the inverted channel 21. Each spring 27 is contracted from its normal condition, as indicated in Figure 4, with the conduit 24 inflated. This is due to the fact that inflation of the conduit 24 will push downwardly on the channel 22 thereby exerting a downward pull on the set of bolts 19 of each unit 16 and the plate 17 thereof so as to compress all of the springs 27 and move the shoe 15 throughout its length away from the rollers 13. However, when the conduit 24 is deflated, as shown in Figure 3, the springs 27 will expand to their original condition, since the channel 22 will be permitted to move farther upwardly within the inverted channel 21 but not in contact therewith, thereby permitting the plates 17 and the shoe 15 to move upwardly. The shoe will thus frictionally engage the lower sides of the rollers, as shown in Figure 3.

As indicated in Figure 1, the conduit 24 extends the full length of the conveyor unit 10 between the continuous channels 21 and 22. Control of flow of fluid into and out of the hose 24 to release or apply the brake system may be accomplished with a suitable manually-operated valve, indicated diagrammatically at 30, in the fluid supply line 31 which is connected to the conduit 24.

As long as the pressure in the conduit 24 is applied, the brake system will be in released condition, as shown in Figure 4, since the springs 27 will be contracted, thereby moving the shoe 15 away from the rollers 13. However, as soon as pressure is released from the conduit 24 the brake system is applied, as shown in Figure 3, by expansion of the springs 27 which causes movement of the shoe 15 into contact with the rollers 13. Thus, in case of failure of the brake system, for example, if the conduit 24 breaks or leaks, the brake will be applied due to release of the springs 26.

Figure 8:
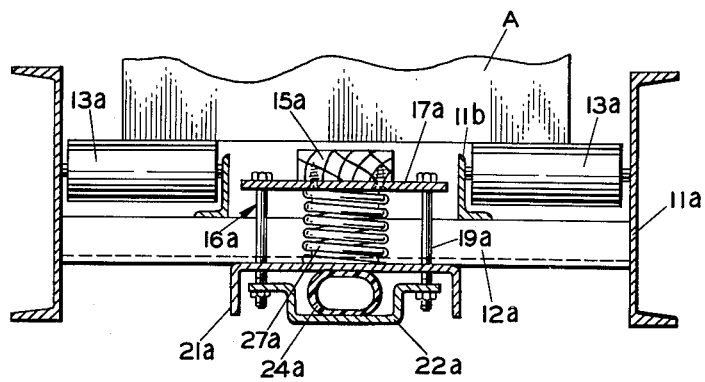
Figure 8 is a view similar to Figure 7 but showing the brake released.
Figure 9:
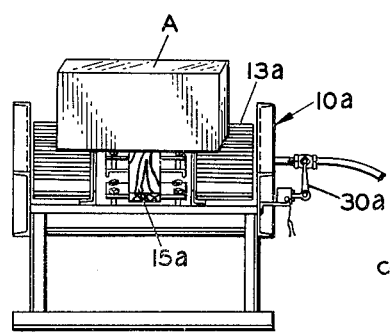
Figure 9 is an end view of a conveyor unit of the type indicated in Figures 7 and 8 showing the braking system associated therewith.

In Figures 7, 8 and 9, there is illustrated a modified type of conveyor unit 10a to which the braking system of this invention can be applied. In this instance, the freely rotatable rollers 13a are arranged in two separate rows. Articles A rest on the two rows of rollers 13a and bridge the space therebetween. These articles will feed by gravity along the two rows of rollers since the conveyor unit 10a will be inclined, as indicated in Figure 9. Each row of rollers may be carried by an outer channel 11a and by an inner angle 11b to which the transverse angles 12a are secured.

In this instance, the brake shoe 15a is mounted for vertical movement between the angles 11b extending substantially parallel to said angles and preferably located midway therebetween. The shoe 15a is under control of brake releasing and applying units as in the structure described above. The shoe 15a is carried by the plates 17a exactly as before and these plates are mounted by the bolts 19a for vertical movement relative to the fixed inverted channel 21a. As before, the cradle channel 22a is disposed within the inverted channel 21a and is carried by the lower ends of the bolts 19a for vertical movement therewith. The inflatable conduit 24a in cooperation with the springs 27a control application and release of the brake exactly as before. However, the braking force exerted by the shoe 15a is applied directly to the articles A supported along the conveyor, it being understood that the brake shoe preferably extends the full length of the conveyor unit.

In the operation of this form of the invention, as long as the pressure in the conduit 24a is applied, the brake system will be in released condition as shown in Figure 8, since the springs 27a will be contracted, thereby moving the shoe 15a away from the lower surfaces of the articles A. However, whenever pressure is released from the conduit 24a, the brake system is applied as shown in Figure 7, by expansion of the springs 27a which cause movement of the shoe 15a into contact with the lower surfaces of the articles A. Thus, in this form of the invention, the braking action is applied directly to the articles A rather than to the rollers. As shown in Figure 7, the springs 27a preferably are not of sufficient strength to lift the articles from the rollers 13a but there will be no objection if the springs do lift the articles from the rollers, in which case channel 22a would actually contact the inverted channel 21a in Figure 7.

If desired, flow of pressure into the conduit 24a may be controlled by an electrically operated valve 30a which is indicated diagrammatically in Figure 9. This valve can therefore be controlled from a remote location and may be controlled automatically if desired.

According to this invention there is provided a braking system for a gravity feed roller type conveyor wherein resiliently yieldable means tends to apply the brake and fluid pressure actuated means is operable to release the brake.

It will be apparent from the above description that this invention provides for a simple and inexpensive brake system whereby the articles on gravity feed roller type conveyors are completely under control at all times. In case of failure of the brake system, movement of the articles on the conveyor unit is automatically stopped by application of the brake.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a gravity feed, roller-type conveyor including a supporting frame and a plurality of article-supporting and conveying rollers rotatably carried by said frame; a brake shoe positioned longitudinally in said frame and movable toward and away from a braking position; brake-applying and releasing units supported by said frame and disposed along said shoe; each of said units comprising a shoe-supporting bracket attached to said shoe and movable therewith, a relatively fixed bracket supported by said frame, a compression spring positioned between said shoe-supporting bracket and said fixed bracket and arranged normally to maintain said shoe in a braking position, a conduit-confining bracket disposed in spaced relation to said fixed bracket and connected for movement with said shoe-supporting bracket; and a flexible fluid-pressure inflatable conduit positioned between the fixed bracket and the conduit-confining bracket of each of said units and operable upon inflation to move said shoe away from said braking position in opposition to the springs of said units.

2. The combination defined in claim 1, wherein said shoe-supporting bracket comprises a plate attached to the lower surface of said shoe and provided with a plurality of depending bolts which pass slidably through said fixed bracket, and said fixed bracket comprises an inverted channel extending substantially the full length of said conveyor, and wherein said conduit-confining bracket comprises a channel-shaped cradle secured to the lower ends of said bolts in coextensive relation with said fixed bracket and movable with said bolts relative to said fixed bracket upon inflation of said conduit.

3. The combination defined in claim 1, wherein the rollers of said conveyor extend continuously across said frame, and wherein said brake shoe is arranged to frictionally engage each of said rollers to prevent rotation thereof when said shoe occupies its braking position.

4. The combination defined in claim 1, wherein said rollers are disposed in transversely spaced, parallel rows extending longitudinally of said frame, and wherein said brake shoe is arranged to frictionally engage articles supported upon said rollers when said shoe occupies its braking position.

5. In a gravity feed conveyor including a supporting frame and a plurality of transversely disposed, longitudinally spaced rollers rotatably carried by said frame and having upper segments thereof defining an antifriction conveyor bed; releasable brake means comprising an elongated brake shoe extending longitudinally substantially the full length of said conveyor beneath said rollers and movable into and out of frictional engagement with the under surface of each of said rollers; resiliently contractible spring means connected with said shoe and arranged normally to maintain said shoe in frictional engagement with each of said rollers; a first conduit-confining channel means extending longitudinally of said conveyor and connected to and movable with said brake shoe; a second conduit-confining channel means stationarily carried by said frame in opposed, coextensive relation to said first conduit-confining channel means; and a fluid-pressure expansible conduit arranged between said first and second channel means and operable upon expansion to move said brake shoe out of frictional engagement with said rollers against the action of said spring means.

References Cited in the file of this patent

UNITED STATES PATENTS

| | | | |
|---|---|---|---|
| 742,722 | Nelson | Oct. 27, | 1903 |
| 1,792,895 | Cowlishaw | Feb. 17, | 1931 |
| 1,900,149 | Anderson | Mar. 7, | 1933 |
| 2,193,481 | Fawick | Mar. 12, | 1940 |
| 2,292,753 | Gerald | Aug. 11, | 1942 |
| 2,292,821 | Caulkins | Aug. 11, | 1942 |
| 2,668,714 | Huck | Feb. 9, | 1954 |